UNITED STATES PATENT OFFICE.

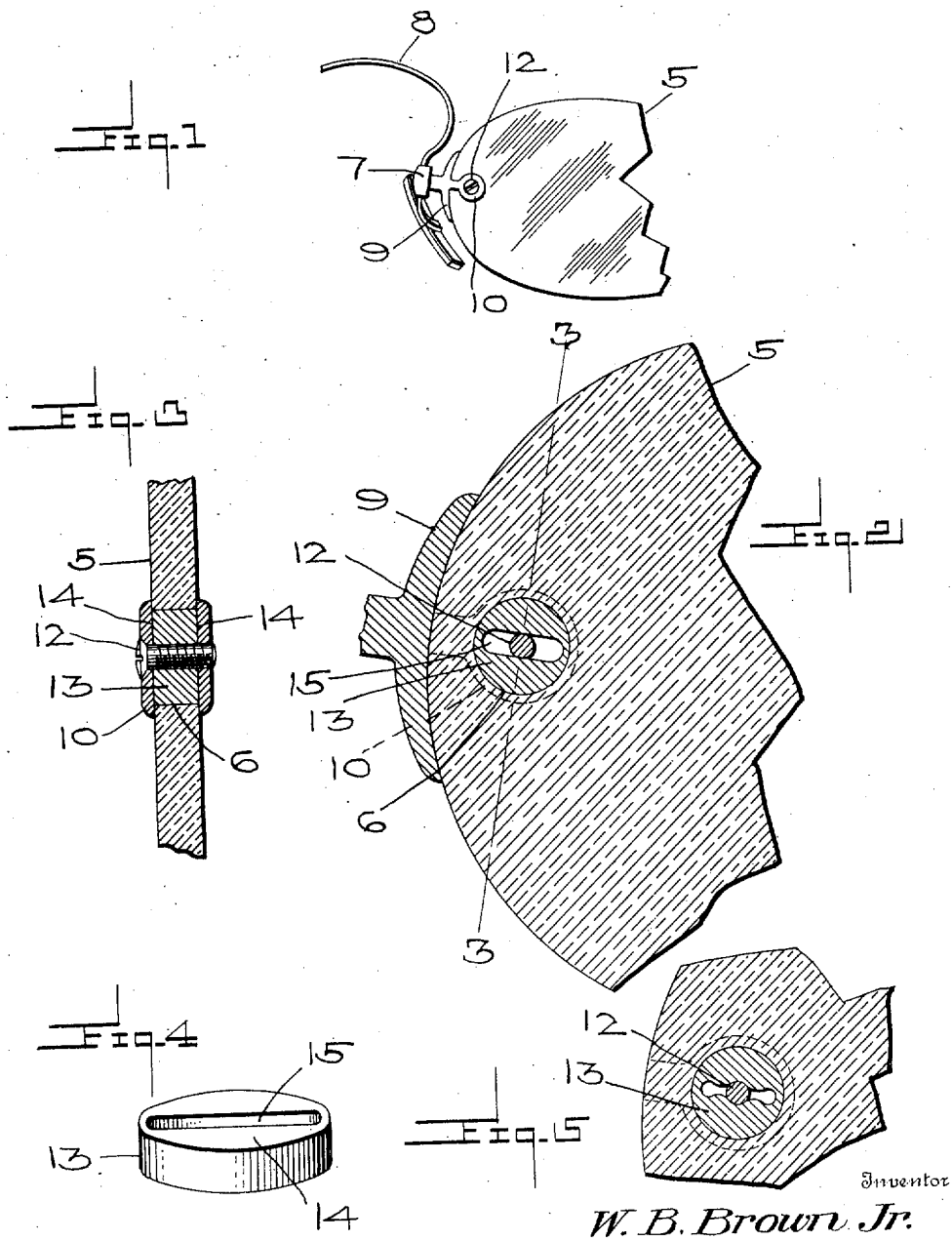

WILLIAM B. BROWN, JR., OF MOUNT VERNON, OHIO.

EYEGLASS-MOUNTING.

977,163. Specification of Letters Patent. Patented Nov. 29, 1910.

Application filed March 1, 1909. Serial No. 480,671.

*To all whom it may concern:*

Be it known that I, WILLIAM B. BROWN, Jr., a citizen of the United States, residing at Mount Vernon, in the county of Knox and State of Ohio, have invented certain new and useful Improvements in Eyeglass-Mountings, of which the following is a specification.

This invention relates to certain new and useful improvements in eyeglasses, and comprises a mounting, whereby the lenses are adjustably secured to the frame.

The object of my invention is, to provide a means, whereby a lens may be securely held to its securing frame, in a manner insuring a firm meeting of the lens edge against the wing of the mounting, to prevent any movement of the lens.

With these and other objects in view the present invention consists in the combination and arrangement of parts, as will be hereinafter more fully described, and particularly pointed out in the appended claims, it being understood that changes in the specific structure shown and described may be made within the scope of the claims, without departing from the spirit of the invention.

In the drawings forming a part of this specification and in which like numerals of reference indicate similar parts in the several views, Figure 1 shows a broken portion of an eyeglass equipped with my invention, Fig. 2 shows an enlarged sectional view through the plug, Fig. 3 shows a transverse sectional view on line 3—3, Fig. 2, Fig. 4 shows a perspective view of the plug, Fig. 5 shows a modification wherein a compressible plug is used.

In the manufacture of eyeglasses, of that class known as rimless eyeglasses, it is quite important, that the lens should be firmly seated against the wing of the strap. Where no special fastening means are provided it is the practice to file out the stud opening in the lens, or bend the wing ends. This however is an objectionable method, and in this my present invention I particularly aim to provide a simple, inexpensive, readily operated device, whereby the lens may be firmly held against the full inner rim surface of the wing.

In the accompanying drawings, 5 represents the lens, 7 the mounting and 8 the spring of an eyeglass as usually constructed. The mounting is provided with the usual wings 9, and the spaced perforated straps 10, between which the lens is held, by means of the screw 12, in the usual manner.

In my invention, however, I provide the lens with an opening 6, as shown in Fig. 2, which is almost as large as the strap end 10, the strap being of conventional shape.

Held snugly within the circular opening 6, is a cylindrical plug 13, made of metal, fiber or other suitable material which has its ends 14 shaped to conform to the faces of the lens within which the plug is to be secured. These plugs are made in various lengths to conform to the thicknesses of the different lenses, and each has an elongated opening or slot 15, in which is slidably held the stem of the set screw 12, by means of which the lens is held to the mounting.

The wings 9 strictly conform to the shape of the lenses, so that the operation of securing the same to the lens simply requires that the mounting be firmly held to the lens edge while the set screw 12 is firmly seated. The set screw 12 finds a proper adjustment within the slot 15, insuring the lens being securely held. As the straps 10 overlap the plug 13 they also firmly engage the faces of the lens to hold the same against accidental displacement.

Where the plugs are made of a compressible material, such as celluloid or other fibrous material, the plug is distorted as shown in Fig. 5, when the set screw is driven home, as in this case the plugs are made a little longer than the thickness of the lenses, which results in the material being crowded inward to fill the space 15. This results in the screw being embedded as it were within the plug, after the same has been given a desired position within the slot.

As shown in Fig. 2, the slot 15 extends longitudinally of the lens so that the same may be freely moved toward the wing 9, in fixing the mounting. The stem of the screw 12 is of a diameter equal to the width of the slot 15 so that the screw snugly slides within the slot.

It is further to be observed that by the employment of the slotted yielding plugs 13, as shown, the latter will yield sufficiently without expanding when pressure is brought to bear upon the mounting by the screw 12 in securing the lens in position, thereby preventing any possibility of cracking or otherwise destroying the lens in adjusting and binding the several parts together.

Having thus described my said invention what I claim as new and desire to secure by United States Letters Patent is:

1. In combination with an eye glass mounting, a lens adapted to be removably secured to the latter and provided with an opening, a plug within said opening, said plug having a slot extending therethrough, and a screw passing through the said mounting and freely received by the slot formed in the plug, whereby the lens may be adjusted in its proper position with respect to the mounting.

2. In combination with an eyeglass mounting, a lens adapted to be adjustably secured thereto, said lens having an opening formed therein adjacent to its edge, a yielding plug removably located within the opening of the lens and of a length slightly greater than the thickness of the lens, said plug having a slot positioned substantially lengthwise of the lens, and a screw passing through the mounting and through the slot of the plug, the diameter of said screw being equal to the width of the slot, whereby the yielding washer will not be expanded sufficiently to destroy the lens when the binding screw is properly adjusted for securing the several parts.

In testimony whereof I affix my signature, in presence of two witnesses.

WILLIAM B. BROWN, Jr.

Witnesses:
ROBERT R. GEORGE,
WM. SCHAUFARBER.